Sept. 29, 1931.   N. STERN   1,825,555
BRAKE
Filed Feb. 12, 1929   2 Sheets-Sheet 2

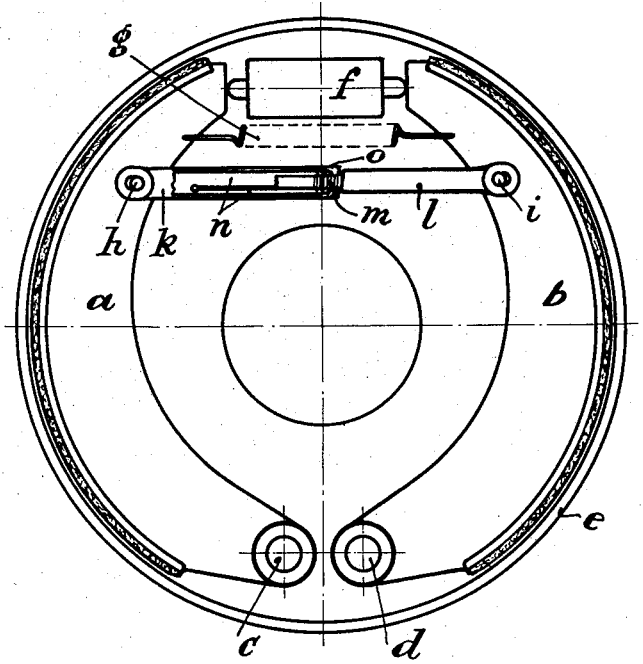
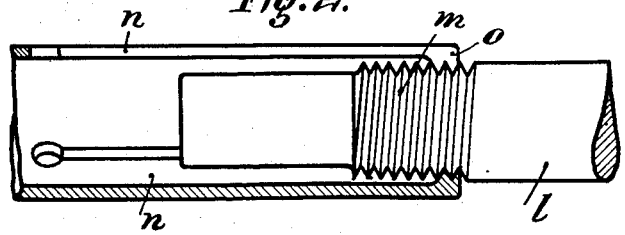
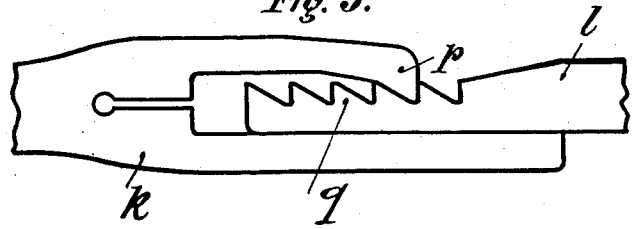

Inventor
Nathan Stern
by Henry Orth
Atty

Patented Sept. 29, 1931

1,825,555

UNITED STATES PATENT OFFICE

NATHAN STERN, OF FRANKFORT-ON-THE-MAIN, GERMANY, ASSIGNOR TO ALFRED TEVES MASCHINEN-UND ARMATUREN-FABRIK GESELLSCHAFT MIT BESCHRANKTER HAFTUNG, OF FRANKFORT-ON-THE-MAIN, GERMANY, A CORPORATION

BRAKE

Application filed February 12, 1929, Serial No. 339,389, and in Germany November 2, 1927.

In hydraulic and other brakes for motor vehicles and the like the stops limiting the brake blocks have, in some cases, been made adjustable by means of screws or eccentrics to enable account to be taken of wear of said brake blocks. It is also known to incorporate automatic adjusting devices including self locking means in the brake linkage, the object being to lengthen the linkage when wear of the brake blocks has taken place. This, however, has the disadvantage that the entire braking force must be transmitted through these extensible devices which must therefore be made correspondingly strong and are expensive and complicated as a consequence.

These defects are eliminated by the present invention by reason of the fact that the locking means are independent of the linkage, being connected directly with the brake blocks. The arrangement thereby becomes extremely simple and inexpensive since it is only stressed by the return spring for the brake blocks and does not transmit the braking force itself. According to the invention the adjustable stop consists of two parts which are pivoted to the brake blocks with a play relative to the blocks corresponding to the play between the brake blocks and the brake drum. The two parts are connected together by locking means of any appropriate type. When wear of the brake blocks or brake drum has taken place the locking means advance, say by a tooth, so that the brake blocks are moved apart by a corresponding amount.

In one embodiment of the invention one of the parts constituting the stop is provided at its end with a screw thread with which the other part, embracing the first mentioned part in the fashion of a tube, engages by means of a corresponding internal thread. The tubular part is slotted at its end and the internal thread is provided in a thickened tube wall so that two or more cheeks are produced which engage by their internal thread over the external thread of the other part. The total length of the two part stop and therewith the distance between the two brake blocks may be altered by rotation of the said two parts relatively to one another. In addition the screw thread acts as a locking means.

Figure 4:
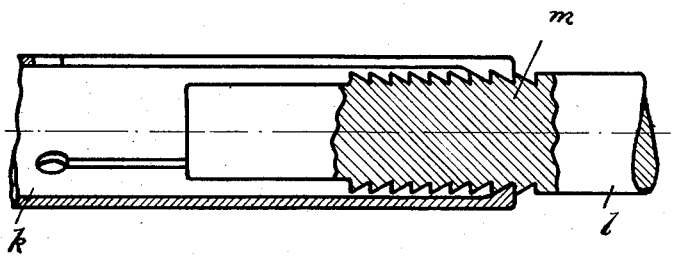

Embodiments of the invention are illustrated by way of example in the accompanying drawings in which:

Fig. 1 is a side elevation of one embodiment,

Fig. 2 a view to a larger scale of the locking means,

Fig. 3 a view similar to Fig. 2 of a second embodiment,

Fig. 4 is a longitudinal section showing a form of pawl and rack.

Figure 5:
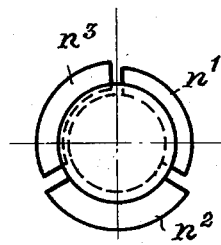
Figure 6:
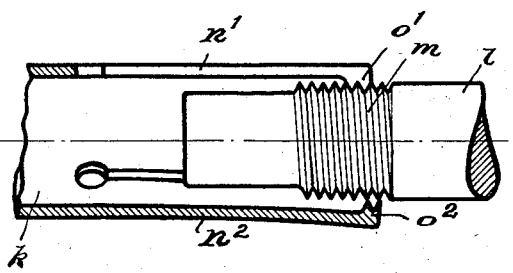

Fig. 5 an end view and Fig. 6 a longitudinal section showing screw engaging cheeks of different pitch.

Figure 7:
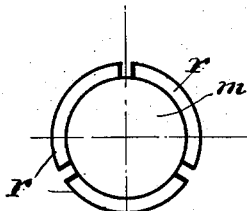
Figure 8:
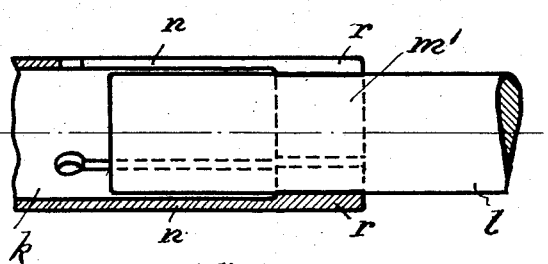

Fig. 7 is an end view, and Fig. 8 a longitudinal section of a friction arrangement.

In the example illustrated in Figs. 1 and 2 the brake blocks are indicated by the reference letters $a$ and $b$. They are rotatable about the pivots $c$ and $d$ and are adapted to bear from the inside against the brake drum $e$. The braking cylinder acting upon both blocks is referred to by $f$ and the return spring by $g$.

Links $k$ and $l$ are pivoted to each brake block at $h$ and $i$ respectively, each pivot having a play corresponding to the amplitude of movement of the brake blocks during braking. The link $l$ is provided with an external thread $m$.

The other link $k$ is tubular and its end is divided by several slots into a number of cheeks $n$ which at their forward edge $o$ are thickened or turned up and are provided there with one or two threads engaging with the external thread $m$.

If, due to wear of the brake blocks or brake drum, the braking movement has become larger, then on application of the brakes the two parts $k$ and $l$ draw apart somewhat, the springiness of the cheeks enabling the internal threads $o$ to snap over the external thread $m$.

By relative rotation of the parts $l$ and $k$ the total length of the two part stop, that is, the distance between the two brake blocks $a$ and $b$, may be altered, this being of importance for the assembly of the brake.

The flank angles of the thread $m$ may have the same inclination on both sides since the return spring $g$ is not sufficiently strong to cause the internally threaded part to snap of its own accord over the external threads $m$. Alternatively, however, the threads may be constructed so that the flanks of the individual threads form a right angle to the axis on one side and an acute angle on the other side Fig. 4.

In certain circumstances the external and internal threads may be designed with different pitches Figs. 5 and 6. In this case the internally threaded portions $o'$ of the individual cheeks $n'$ of the stop part $k$ must be offset relatively to one another by fractions of the pitch of the external thread $m$ so that even on relative displacement of the two parts $l$ and $k$ through a fraction of the pitch of the thread of one of the cheeks $n'$ snaps with its threads $o'$ into the external thread $m$. In this construction the threads $o'$ on the cheeks $n'$ are preferably extended over a slight width only.

In the construction illustrated in Fig. 3 the two brake blocks are in the same manner as above described.

The two stop parts $k$ and $l$ are pivoted with play. The part $k$ is provided with a spring locking tooth $p$, while the link $l$ is furnished with a corresponding locking rack $q$, in which the tooth $p$ engages.

Thus the two links $k$ and $l$ with the tooth $p$ and rack $q$ respectively support one another and thus constitute a stop for the brake blocks $a$ and $b$. The play at the pivots $h$ and $i$, moreover, allows of the brakes being applied without the links $k$ and $l$ being influenced thereby.

If, however, the brake blocks become worn at their outer periphery or the brake drum at its inner periphery then the brake blocks on application against the drum have to move through a larger path. As a result the two links $k$ and $l$ are drawn apart so that the tooth $p$ snaps into the next notch in the rack $q$ and thus holds the two links $k$ and $l$ in the new extended position. If still further wear took place the tooth $p$ would snap into the following notch. Thus the total length of the two links $k$ and $l$ will become correspondingly larger and said two links constitute a stop for the brake blocks which is always in the correct position and the braking movement of the brake blocks need never be larger than when the brake blocks are unworn.

The pitch of the teeth may naturally be designed to meet requirements, for example so that even a comparatively small wear results in adjustment taking place. If occasion demand this tooth and rack lock arrangement may be replaced by suitable friction or clamping locking means working by means of a friction block, a wedge, a sphere, a clamping or jamming roller or the like.

A form of a friction block device is illustrated in Figs. 7 and 8, wherein $m'$ is a smooth surface replacing the serrated surface $m$ of the other forms illustrated, and the ends $r$ of the cheeks $n$ are not serrated so as to frictionally engage the portion $m'$.

Similarly it is also possible to provide each link $k$ and $l$ with a separate locking means which cooperates with a suitable point on the brake block support.

The stop is particularly applicable to hydraulic brakes although naturally it may also be used for any other type of brakes such as pneumatic, electrical, mechanical or the like brakes.

What I claim is:

1. A brake comprising a brake drum, two brake shoes therefor and means to move the shoes into and out of engagement with the drum; in combination with a member loosely connected at one end to one of said shoes, spring fingers on the other end of the member, a second member loosely connected to the other shoe and having a screw thread thereon engaged by the fingers, said fingers differing in length by a fraction of the pitch of said thread.

2. A brake comprising a brake drum, two brake shoes therefor and means to move the shoes into and out of contact with the drum; in combination with a tube loosely connected at one end to a shoe and having spring fingers, and a second element loosely connected at one end to the other shoe and having on its opposite end a screw thread entering the tube between the fingers, said fingers engaging the thread at points differing a fraction of the pitch of the thread.

In testimony that I claim the foregoing as my invention, I have signed my name this 29th day of January, 1929.

NATHAN STERN.